B. RHODES.
Manufacture of Irregular Shaped Vessels.
No. 6,552. Reissued July 20, 1875.
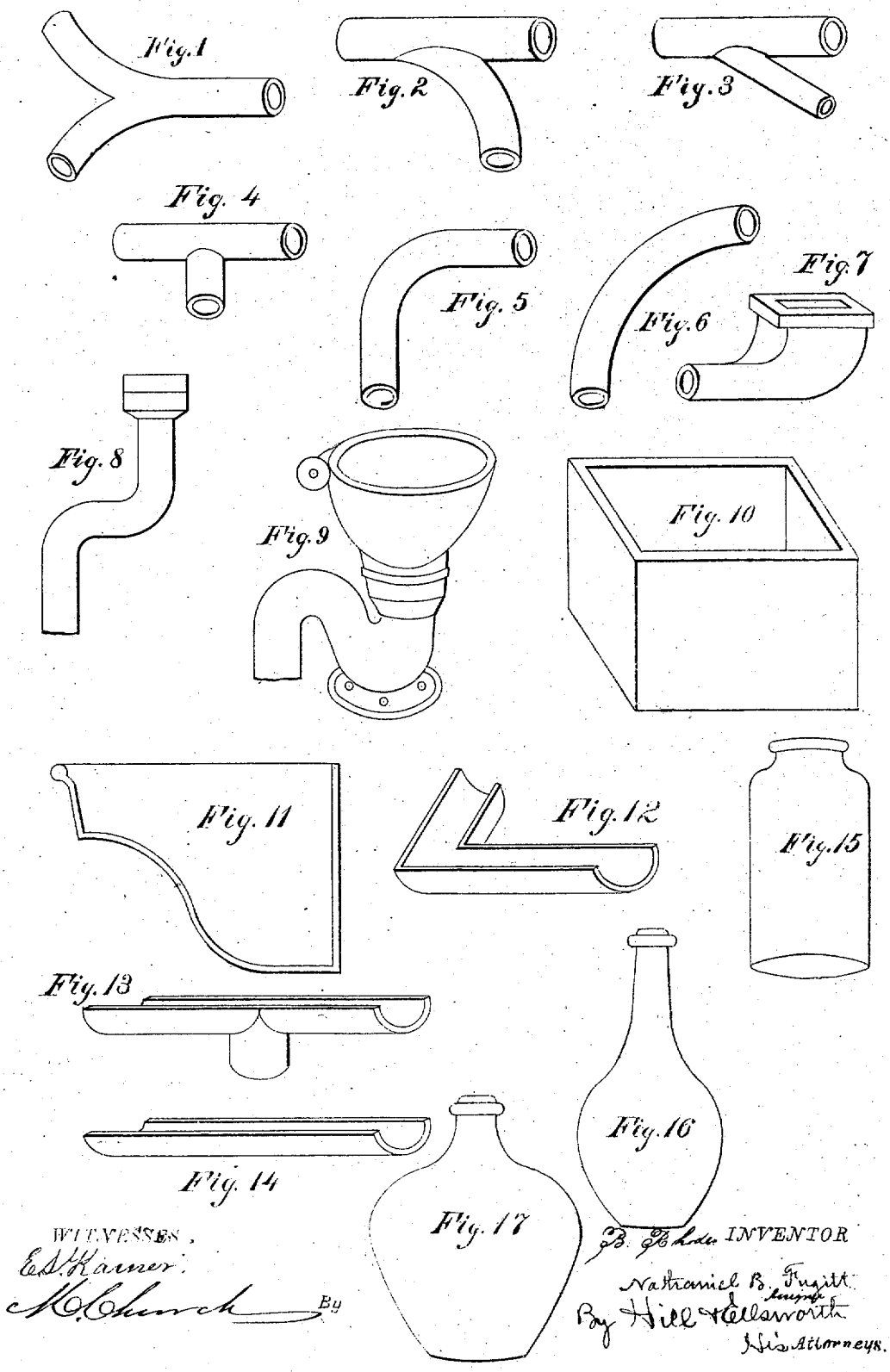
WITNESSES.
E. S. Kanner.
M. Church By
B. Rhodes INVENTOR
Nathaniel B. Fugitt
Lungt
By Hill & Ellsworth
His Attorneys.

UNITED STATES PATENT OFFICE.

BENJAMIN RHODES, OF BOW, ENGLAND, ASSIGNOR, BY MESNE ASSIGNMENTS, TO NATHANIEL B. FUGITT, OF WASHINGTON, D. C.

IMPROVEMENT IN THE MANUFACTURE OF IRREGULAR-SHAPED VESSELS.

Specification forming part of Letters Patent No. 41,351, dated January 19, 1864; reissue No. 6,552, dated July 20, 1875; application filed March 25, 1875.

DIVISION B.

*To all whom it may concern:*

Be it known that BENJAMIN RHODES, of Bow, England, did invent certain new and useful Improvements in the Manufacture of Irregular-Shaped Vessels; and I do hereby declare the following to be a full and exact description of the same, reference being had to the accompanying drawings forming part of this specification, in which—

Figures 1 to 17, inclusive, represent a number of the vessels.

The present invention consists in the manufacture of irregular-shaped vessels from fibrous or textile materials combined with an adhesive water-proof substance, in the following manner, to wit:

An elastic or looped fabric of cotton, hemp, flax, or other suitable material, made circular or cylindrical in form, is first drawn over a core piece or pattern of the requisite shape, such as a pipe-elbow, a bottle, jar, or other like vessel, the elasticity of such fabric causing it to adapt itself to the shape or configuration of the pattern. The whole is then dipped into a bath of bituminous mastic or composition, and a second elastic coating drawn over the first, after which it is again dipped, the process of alternately coating with fabric and dipping the same into the bituminous bath being continued until the requisite thickness of the article to be produced is obtained.

For the purpose of facilitating the removal of the articles thus formed from the pattern, and to give them the final shape or finish, the pattern may be halved or otherwise divided, and the parts secured in such a manner as to hold them firmly while the requisite finishing pressure is applied to the article.

In order to form T-shaped pipe-joints and other compound figures the elastic or looped cylindrical fabric may be used either alone or in combination with sheets or webs of the same fabric, the overlapping or adjoining ends thereof being secured by wire binding, or by being sewed or stitched together with wire, thread, or other material. Each coating or envelope thus applied is dipped in a bath of, or otherwise treated with, liquid bitumen or bituminous composition.

I claim as the invention of BENJAMIN RHODES—

1. Irregular-shaped vessels, consisting of alternate layers of fibrous or textile fabrics built up in bitumen or bituminous mastics or compositions, substantially as described.

2. The process of forming irregular-shaped vessels by drawing over a core or pattern of the required shape several layers of an elastic or looped fabric and dipping the pattern, after each layer is applied, into a bath of bitumen or bituminous mastic or composition, substantially as described.

NATHL. B. FUGITT.

In presence of—
WM. C. MCINTIRE,
ARTHUR L. MCINTIRE.